(12) United States Patent
Kolb

(10) Patent No.: US 6,951,240 B2
(45) Date of Patent: Oct. 4, 2005

(54) HEAT EXCHANGER PACKAGE

(75) Inventor: John A. Kolb, Old Lyme, CT (US)

(73) Assignee: Transpro, Inc., New Haven, CT (US)

( * ) Notice: Subject to any disclaimer, the term of this patent is extended or adjusted under 35 U.S.C. 154(b) by 266 days.

(21) Appl. No.: 10/289,513

(22) Filed: Nov. 6, 2002

(65) Prior Publication Data

US 2004/0104007 A1 Jun. 3, 2004

(51) Int. Cl.[7] .............................. B60K 11/04; B60H 1/00
(52) U.S. Cl. ........................... 165/42; 165/121; 165/67; 29/890.03; 180/68.4
(58) Field of Search ........................... 165/41, 44, 121, 165/67, 51, 42, 43; 180/68.1, 68.4, 903; 123/41.48, 41.04, 41.58; 29/890.03

(56) References Cited

U.S. PATENT DOCUMENTS

| | | | |
|---|---|---|---|
| 4,736,727 A | | 4/1988 | Williams |
| 4,938,303 A | * | 7/1990 | Schaal et al. ............... 180/68.1 |
| 5,046,550 A | | 9/1991 | Boll et al. |
| 5,046,554 A | * | 9/1991 | Iwasaki et al. ............... 165/44 |
| 5,062,473 A | * | 11/1991 | Ostrand et al. ............... 165/42 |
| 5,234,051 A | * | 8/1993 | Weizenburger et al. ....... 165/41 |
| 5,267,624 A | * | 12/1993 | Christensen ............... 180/68.3 |
| 5,316,079 A | * | 5/1994 | Hedeen ....................... 165/67 |
| 5,353,757 A | | 10/1994 | Susa et al. |
| 5,526,873 A | | 6/1996 | Marsais et al. |
| 5,566,748 A | * | 10/1996 | Christensen ................. 165/67 |
| 6,223,811 B1 | * | 5/2001 | Kodumudi et al. ......... 165/121 |
| 6,408,939 B1 | | 6/2002 | Sugimoto et al. |
| 6,619,379 B1 | * | 9/2003 | Ambros et al. ............... 165/41 |
| 2002/0020365 A1 | | 2/2002 | Wooldridge |
| 2003/0106669 A1 | | 6/2003 | Ambros et al. |
| 2005/0109483 A1 | * | 5/2005 | Kolb ........................... 165/41 |
| 2005/0109484 A1 | * | 5/2005 | Kolb et al. ................... 165/42 |

* cited by examiner

Primary Examiner—Ljiljana Ciric
(74) Attorney, Agent, or Firm—DeLio & Peterson, LLC; Peter W. Peterson

(57) ABSTRACT

A heat exchanger package for a motor vehicle includes a radiator and charge air cooler, each having a length between opposite ends and including front and rear opposite faces through which air flows. Each has an overlapping fluid-cooling portion at one end, wherein the rear face at one end of the radiator is disposed adjacent the front face at one end of the charge air cooler, such that the air flows sequentially in series through the overlapping portions of each. Each further has a non-overlapping fluid-cooling portion at the opposite end wherein the rear face at the opposite end of the radiator extends outward of the charge air cooler and the front face at the opposite end of the charge air cooler extends outward of the radiator, such that the air flows singularly and in parallel through each of the non-overlapping portions.

27 Claims, 12 Drawing Sheets

HEAT EXCHANGER PACKAGE

BACKGROUND OF THE INVENTION

1. Field of the Invention

The invention relates to heat exchanger devices for cooling fluids used in an engine of a motor vehicle, and more particularly, the invention relates to a heat exchanger package including a coupled radiator and charge air cooler for an engine of a heavy-duty highway truck or bus.

2. Description of Related Art

Heat exchanger packages comprising a radiator and a charge air cooler, also known as an intercooler, have been used for years in over the road highway trucks and buses and other heavy-duty motor vehicles. The radiators provide cooling for the engine coolant, usually a 50—50 solution of water and anti-freeze. The charge air cooler receives compressed, charge or intake air from the turbo- or supercharger and lowers its temperature before it enters the engine intake manifold, thereby making it denser, improving combustion, raising power output and reducing emissions. In order to optimize heat transfer in a given heat exchanger package size, the factors of cooling air flow, heat exchanger core restriction, cooling air flow split and cooling air approach and differential temperature must be balanced.

There is usually limited space availability in the engine compartment for such heat exchanger packages because of sloping hoods covering the engine compartment in the front of trucks, and compact engine compartments in the rear of buses. Both the radiator and the charge air cooler are cooled by the ambient air forced through each by the associated fan and the speed of the vehicle. Because desired cooling capability is continually rising along with the desire for increased engine power and the enactment of new emissions regulations which results in increased heat rejection, enormous demands are placed on the heat exchanger package designer to achieve maximum heat transfer in minimum space.

In one prior art configuration shown in FIG. 1, the charge air cooler (CAC) was arranged in series with and located in front of the engine cooling radiator (RAD) so that it would receive the coolest ambient cooling air. A single suction fan (not shown) usually drew air through the charge air cooler and then through the radiator. The radiator often had to be increased in frontal area as a result of this, because its cooling air was now heated by the charge air cooler.

In order to improve cooling by providing the radiator with lower temperature cooling air, the radiator and charge air cooler were sometimes arranged in parallel, with the charge air cooler located above the radiator or beside the radiator. FIGS. 2 and 3 show prior art radiators and charge air coolers in side-by-side configurations, either vertically (FIG. 1) or horizontally (FIG. 2) aligned, so that the ambient air flows in singularly and parallel through each of the heat exchangers. These designs provide that the face areas of both heat exchangers are exposed to fresh cooling air, rather than only that of the charge air cooler. The radiator can thus be smaller in frontal area, but this design often resulted in a larger overall package frontal area or a limitation on heat transfer surface area. A similar arrangement is shown in U.S. Pat. No. 4,736,727.

Other examples of heat exchanger packages known in the art include the configuration wherein the radiator and charge air cooler are placed behind one another in an overlapping arrangement, as shown in FIGS. 4 and 5. In an effort to optimize heat transfer in a heat exchanger package with minimum frontal area, two completely overlapping charge air coolers have been used, arranged in series with the radiator, and located one in front of the radiator and one behind the radiator, as shown in FIG. 4. In this arrangement, the charge air enters the rear charge air cooler first and then flows through the front charge air cooler. This arrangement allows the first stage of charge air-cooling to be accomplished using warm cooling air exiting the radiator, while the second stage is accomplished with fresh ambient air.

Similar results have been achieved by placing behind the radiator a charge air cooler which has a larger frontal area than the radiator, as in the prior art embodiment shown in FIG. 5. In this configuration, the radiator completely overlaps the charge air cooler, with only a portion of the charge air cooler being non-overlapped. In the overlapping portions, the ambient air flows through the two heat exchangers sequentially in series. This provides some charge air cooling using warm cooling air which has passed through the radiator and some charge air cooling using fresh ambient air in the charge air cooler area not covered by the radiator.

A heat exchanger device used in motor vehicles includes two radiator portions in a vertical, staggered arrangement, as shown in U.S. Pat. No. 5,046,550. However, a partition wall prevents air flowing out of one of the radiator portions from flowing into the other radiator portion. A portion of a condenser for an air conditioning system may be located directly behind the upper radiator to receive air which flows out from that radiator. Another portion of the condenser may be located in front of the lower radiator, with that lower radiator receiving the air exiting the other portion of the condenser. An oil cooler may be placed below the second radiator and ducting prevents air flowing out from the oil cooler from flowing into the lower radiator. Another heat exchanger package is shown in U.S. Patent Application Publication No. US2002/0020365 A1, wherein a radiator and charge air cooler are arranged in a cross packaging where the center portions of each overlap, while the opposite end regions of each extend outward from the center portion without overlap. Other overlapping arrangements are shown in U.S. Pat. No. 6,408,939.

Bearing in mind the problems and deficiencies of the prior art, it is therefore an object of the present invention to provide a heat exchanger apparatus which achieves optimized heat transfer using a unique radiator/charge air cooler heat exchanger package arrangement.

It is another object of the present invention to provide a heat exchanger apparatus which provides optimal air flow distributed to specific areas of the radiator/charge air cooler heat exchangers.

It is yet another object of the present invention to provide a method of manufacturing a heat exchanger apparatus which provides various radiator/charge air cooler heat exchanger configurations for optimized cooling.

Still other objects and advantages of the invention will in part be obvious and will in part be apparent from the specification.

SUMMARY OF THE INVENTION

The above and other objects, which will be apparent to those skilled in art, are achieved in the present invention which is directed to a heat exchanger apparatus using air to cool fluids for a motor vehicle comprising a first heat exchanger for cooling a first fluid and a second heat exchanger for cooling a second fluid, each having a length between opposite ends and including front and rear opposite faces through which air flows. Each of the first and second heat exchangers includes an overlapping fluid-cooling portion at one end of the heat exchanger wherein the rear face at one end of the first heat exchanger is disposed adjacent the front face at one end of the second heat exchanger, such that the air flows sequentially in series through the overlapping portions of each of the first and second heat exchangers. Each of the first and second heat exchangers further has a non-overlapping fluid-cooling portion at the end opposite the overlapping portion end wherein the rear face at the opposite end of the first heat exchanger extends outward of the second heat exchanger and the front face at the opposite end of the second heat exchanger extends outward of the first heat exchanger, such that the air flows singularly and in parallel through each of the non-overlapping portions of the first and second heat exchangers.

In one embodiment, the lengths of each of the heat exchangers are parallel to each other and the non-overlapping portions are on opposite sides of the overlapping portions. In another embodiment, the lengths of each of the first and second heat exchangers are perpendicular to each other and the non-overlapping portions are on adjacent sides of the overlapping portions.

The first and second heat exchangers each have a height, and the length may be greater than the height, for example, at least about fifty percent greater than the height, or the the first and second heat exchangers may have substantially the same length and height. The heat exchanger apparatus may further include tanks attached at opposite ends of the lengths, or at opposite ends of the height, of each of the first and second heat exchangers for holding their respective fluids. A first tank attached to one end of the first heat exchanger may be disposed adjacent the front face of the second heat exchanger in the region between the second heat exchanger overlapping and non-overlapping portions, and a first tank attached to one end of the second heat exchanger may be disposed adjacent the rear face of the first heat exchanger in the region between the first heat exchanger overlapping and non-overlapping portions.

The heat exchanger apparatus may be used in combination with a motor vehicle having an engine positioned within an engine compartment at one end of the vehicle. Preferably, the heat exchanger apparatus may be disposed in the engine compartment of the vehicle adjacent the engine, with the lengths of each of the heat exchangers being parallel to each other and substantially horizontal and the non-overlapping portions of the heat exchangers being on opposite sides of the overlapping portions. The apparatus may further include a fan disposed adjacent the overlapping portions of the first and second heat exchangers to provide air flow in series therethrough. The engine compartment of the motor vehicle may be in the front portion of the vehicle so that the heat exchanger apparatus is disposed along a front of the vehicle, as in a highway truck, where the hood slopes downwardly over the engine compartment towards the front of the vehicle. The engine compartment may be in the rear portion of the vehicle, and the heat exchanger apparatus may be disposed along a rear of the vehicle, as in a bus, or along a rear portion side of the vehicle, as in a recreation vehicle or bus.

The fan employed in the heat exchanger apparatus is rotatable about an axis and has at least two blades normally adapted to create a higher air flow across an area aligned with the blades and a lower air flow across an area not aligned with the blades. The fan blades may be substantially aligned with the first tanks of each of the heat exchangers when viewed in a direction normal to both the fan axis and heat exchanger length, whereby the first tanks of each of the heat exchangers block at least a portion of the fan higher air flow and divert at least a portion of such air through the area not aligned with the fan blades. A shroud contains the air flow initiated by the fan and is disposed proximate to the heat exchanger apparatus. The overlapping portion of the first and second heat exchangers also restricts air flow to divert at least a portion of air through the non-overlapping portions of the first and second heat exchangers.

Preferably, one of the heat exchangers is a radiator for cooling liquid engine coolant, and the other of the heat exchangers is a charge air cooler for cooling compressed intake or charge air to the engine.

In another aspect, the present invention relates to a method of manufacturing a heat exchanger apparatus for cooling fluids used in an engine of a motor vehicle. The method comprises providing a first heat exchanger for cooling a first fluid and a second heat exchanger for cooling a second fluid, each having a length between opposite ends and including front and rear opposite faces. The first and second heat exchangers are then positioned to provide an overlapping fluid-cooling portion at one end of each of the heat exchangers wherein the rear face at one end of the first heat exchanger is disposed adjacent the front face at one end of the second heat exchanger, such that the air flows sequentially in series through the overlapping portions of each of the first and second heat exchangers. The positioning of the heat exchangers also provides a non-overlapping fluid-cooling portion at the end opposite the overlapping portion end wherein the rear face at the opposite end of the first heat exchanger extends outward of the second heat exchanger and the front face at the opposite end of the second heat exchanger extends outward of the first heat exchanger, such that the air flows singularly and in parallel through each of the non-overlapping portions of the first and second heat exchangers. The method then includes determining the cooling efficiencies of the first and second heat exchangers, and positioning the first and second heat exchangers to increase or decrease the overlapping and non-overlapping fluid-cooling portions to optimize the heat exchanger cooling efficiencies.

In practicing the method, there may be further included providing tanks attached at opposite ends of the length of each of the first and second heat exchangers for holding the respective fluids of the first and second heat exchangers. A first tank attached to one end of the first heat exchanger is disposed adjacent the front face of the second heat exchanger in the region between the second heat exchanger overlapping and non-overlapping portions and a first tank attached to one end the second heat exchanger is disposed adjacent the rear face of the first heat exchanger in the region between the first heat exchanger overlapping and non-overlapping portions. The method may also include providing a fan disposed adjacent the overlapping portions of the first and second heat exchangers to provide air flow in series therethrough, the fan being rotatable about an axis and having at least two blades normally adapted to create a higher air flow across an area aligned with the blades and a lower air flow across an area not aligned with the blades, the blades being substantially aligned with the first tanks of each of the heat exchangers when viewed in a direction normal to both the fan axis and heat exchanger length, the first tanks of each of the heat exchangers blocking at least a portion of the fan higher air flow and diverting at least a portion of such air through the area not aligned with the fan blades. Positioning the first and second heat exchangers may include adjusting the alignment of the fan blades with the first tanks to optimize the heat exchanger cooling efficiencies. The method may also include positioning the fan with respect to the overlapping and non-overlapping portions of the heat exchangers to optimize the heat exchanger cooling efficiencies.

A further aspect of the present invention provides a method for cooling fluids used in an engine of a motor vehicle, comprising providing a heat exchanger assembly as described above, and flowing ambient air through the heat exchanger assembly such that the ambient air flows sequentially in series through the overlapped portions of each of the first and second heat exchangers and the ambient air flows singularly in parallel through each of the non-overlapped portions of the first and second heat exchangers. Liquid engine coolant may be flowed through one of the heat exchangers and compressed charge air may be flowed through the other of the heat exchangers.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
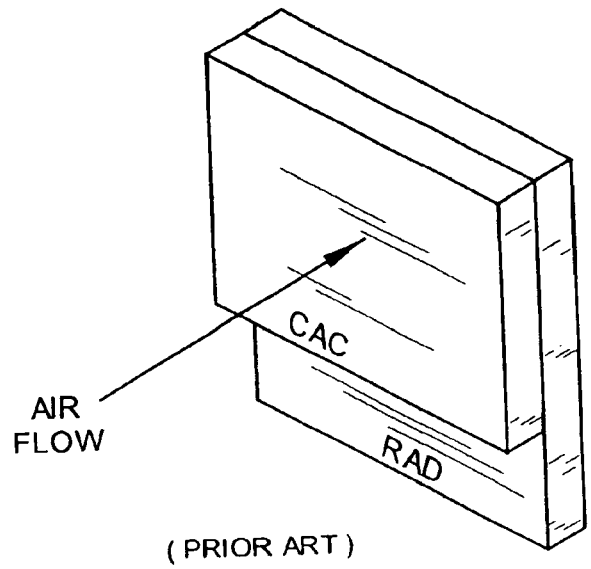
FIGS. 1–5 are perspective views of prior art combination vehicle radiator/charge air cooler heat exchanger apparatus.
Figure 2:
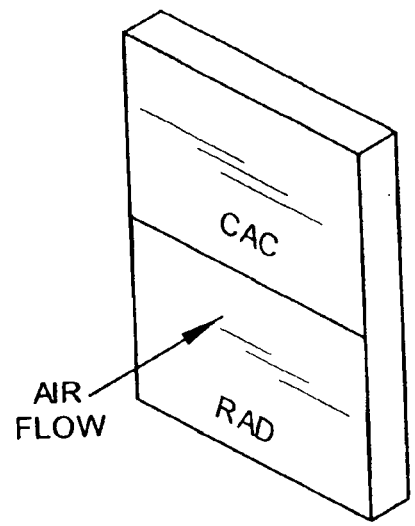
Figure 3:
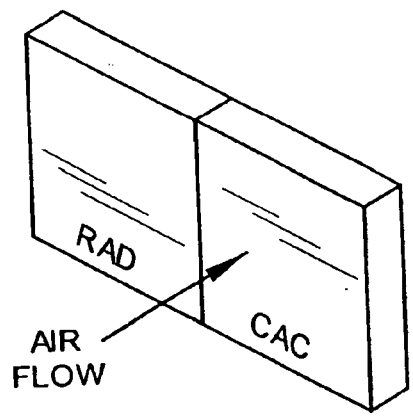
Figure 4:
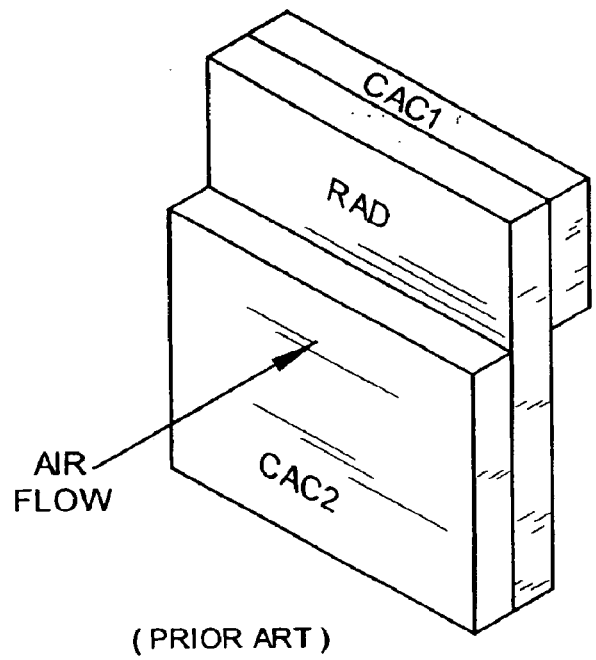
Figure 5:
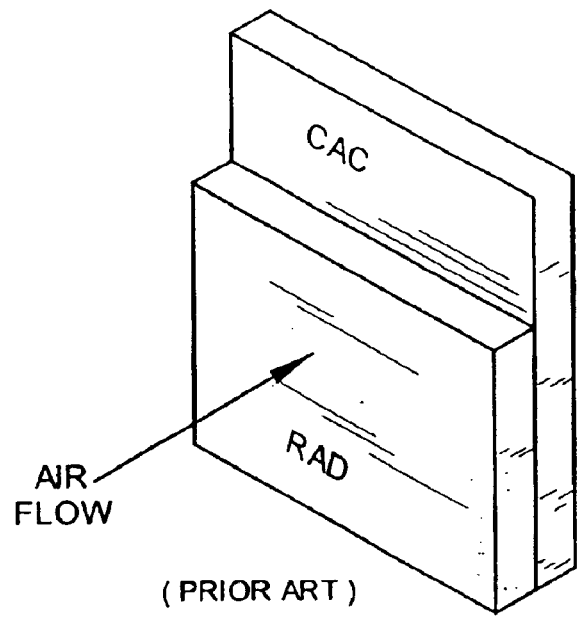

In describing the preferred embodiment of the present invention, reference will be made herein to FIGS. 6–21 of the drawings in which like numerals refer to like features of the invention.

In general, the present invention provides a heat exchanger assembly or package comprising at least two heat exchangers, such as a radiator and a charge air cooler, packaged or configured in a partially overlapping arrangement, at one end of each, for series air flow therethrough, and a partially non-overlapping arrangement, at the other end of each, for parallel air flow. The heat exchanger package according to the present invention can be manufactured in a variety of sizes and shapes complimentary with the engine compartment dimensions of a heavy-duty motor vehicle, such as an over-the-road highway truck or bus. Preferably, the heat exchanger package is manufactured in a low and wide configuration to provide the optimal geometry for current truck and bus heat engine compartments. The hood and body front end of heavy duty vehicles such as trucks typically slope downward toward the front of the vehicle to enhance the aerodynamics of the vehicle. The aerodynamic body style affects the dimensions of the engine compartment of the vehicles and presents challenges to heat exchanger designers to fit effective and efficient heat exchangers within the engine compartment. The heat exchanger package of the present invention provides a design solution by enabling a smaller height than length (i.e., across the width of the vehicle), which readily fits within the engine compartment of vehicles having the aerodynamic body style. The geometry of the heat exchanger package according to the present invention is also adapted for compact installations in the rear of buses, where there are also height limitations. Notwithstanding height limitations in certain applications, the heat exchanger package of the present invention may be used in other orientations where such height limitations are not present.

The preferred heat exchanger package of the present invention places the area of maximum heat exchanger core restriction, that is, the area of overlap of the two heat exchanger cores in series, in line with the area to be swept by the fan blades of a suction fan within the engine compartment. Further, the preferred heat exchanger assembly places the areas of least heat exchanger core restriction, that is, the parallel areas of the two heat exchanger cores, at the package extremities where airflow is usually lower.

Typically, a suction fan is used to generate air flow through the heat exchanger package. A suction fan is one that is positioned in the stream of airflow on one side of the heat exchanger package, and sucks or forces outside, ambient air first through the heat exchanger components, and then through the fan. While suctions fans are preferred, the present invention is also useful with blower fans that flow air in the opposite direction, first through the fan and then through the heat exchanger components. A fan shroud positioned circumferentially around the fan blades is commonly used to contain and direct the airflow.

Figure 6:
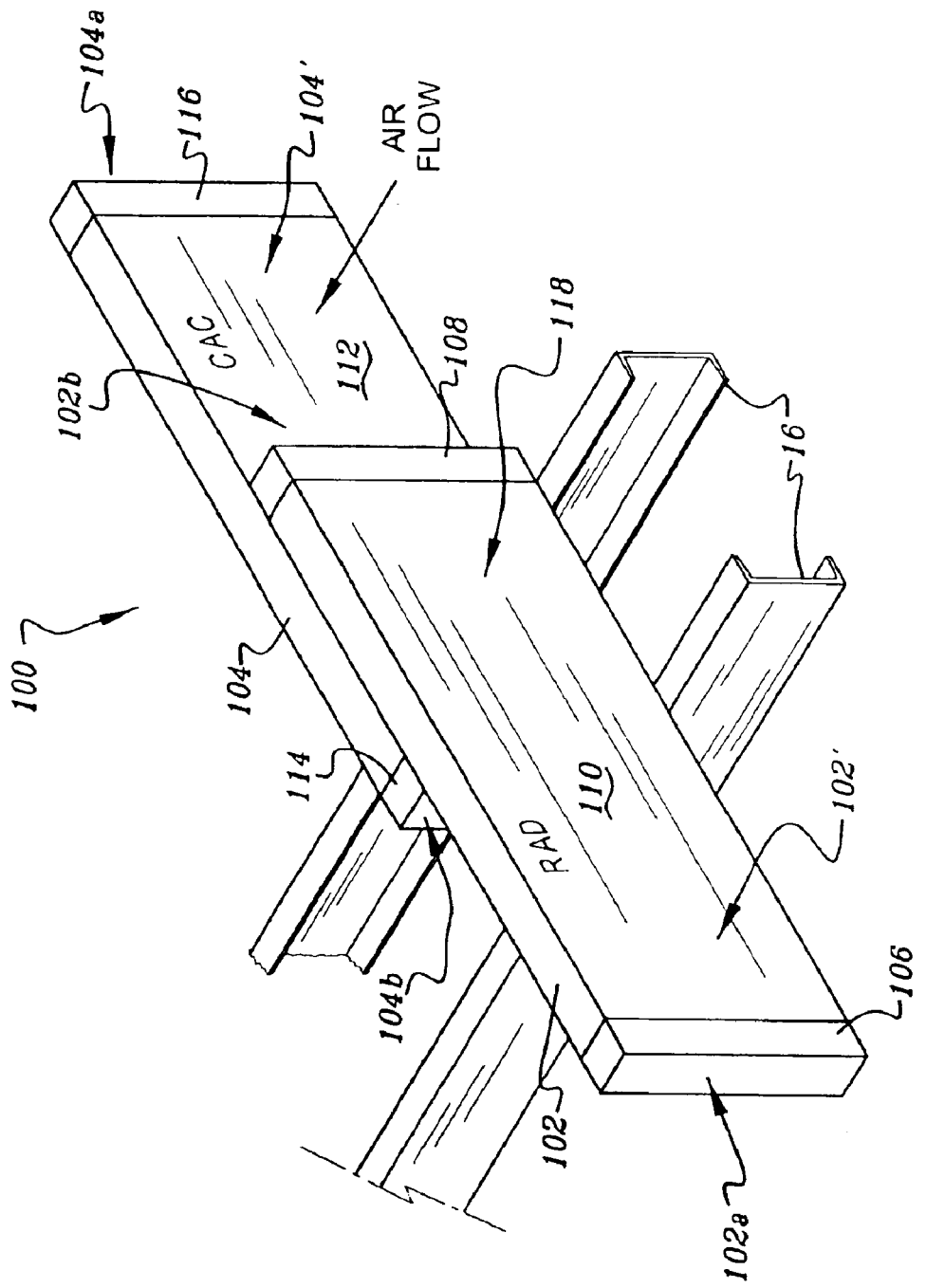
FIG. 6 is a perspective view, from the front, of a first embodiment of the preferred vehicle radiator/charge air cooler heat exchanger package of the present invention with the non-overlapped end portions respectively on either side of the overlapped end portions.
Figure 7:
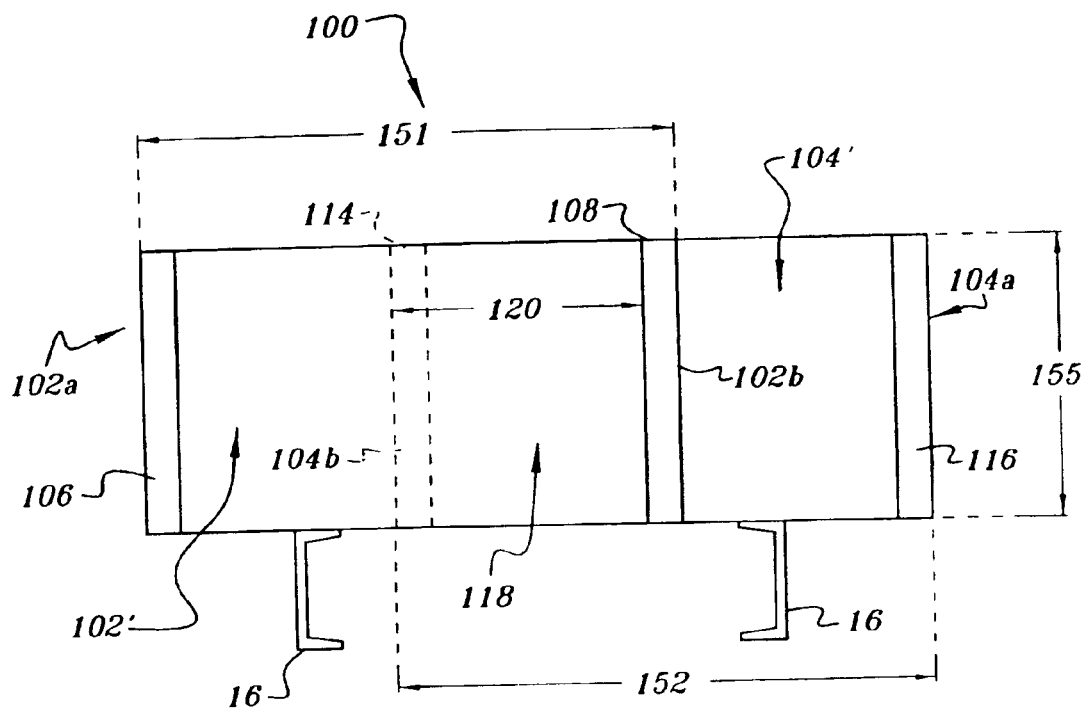
FIG. 7 is a front elevational view of the vehicle radiator/charge air cooler heat exchanger package of FIG. 6.
Figure 8:
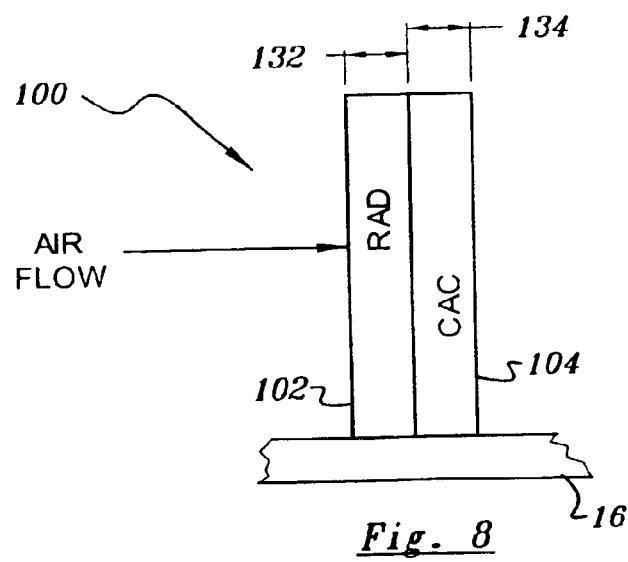
FIG. 8 is a side elevational view of the vehicle radiator/charge air cooler heat exchanger package of FIG. 6.

Referring to FIGS. 6–8, a first embodiment 100 of the heat exchanger assembly according to the present invention is shown including a first heat exchanger, radiator 102, and a second heat exchanger, charge air cooler (CAC) 104. The radiator 102 and charge air cooler 104 are normally in the upstanding, essentially vertical position shown and both include otherwise conventional cores 110, 112, respectively, having front and rear faces and comprising aluminum or brass fluid tubes and aluminum or copper cooling fins for cooling their respective fluids. The radiator 102 cools a first fluid, liquid engine coolant, and the charge air cooler cools a second fluid, compressed air. Radiator 102 includes a first end tank 106 and a second end tank 108 attached on either side of core 110 at opposite ends of the length of the radiator, and extending essentially the full height of the radiator. Similarly to the radiator, charge air cooler 104 includes first and second end tanks or manifolds 114, 116 respectively attached on either side of core 112 at opposite ends thereof, and extending essentially the full height of the charge air cooler. The radiator and charge air cooler tanks may be made of plastic, or may be constructed of metal such as aluminum or brass, or other suitable materials. Preferably, both radiator 102 and charge air cooler 104 are rectangular in shape, with their respective length measurements 151, 152 more preferably being greater than their height measurement 155, as shown in FIG. 7. The total length measurement of the heat exchanger apparatus 100 is preferably consistent with the width requirements for truck and bus engine compartments. The thickness or depth of the radiator 132 and charge air cooler 134 (FIG. 8) may be determined by the particular cooling and space requirements of the application. A frame structure 16 below supports heat exchanger apparatus 100 and, as discussed further below, is positioned within the vehicle engine compartment.

In the heat exchange apparatus 100 depicted in FIG. 6, radiator 102 is positioned partially in series and partially in parallel with charge air cooler 104. End 102a of the radiator extends past end 104b of the charge air cooler and end 104a of the charge air cooler extends past end 102b of the radiator, leaving an overlapping portion 118, shown in FIG. 7, defined between the radiator end 102b and charge air cooler end 104b. The overlapping portion 118 has a length 120 shown in FIG. 7, defined by outermost end 102b of the radiator and outermost end 104b of the charge air cooler, and includes both the tank and a portion of the core of each of the radiator and charge air cooler. In FIG. 6, radiator core 110 has a face at one end of the core adjacent to (but preferably spaced slightly from) the face at one end of charge air cooler core 112 in the overlapping area. The non-overlapping portions of the radiator and charge air cooler are at the end portions opposite the overlapped end portions of each, and include the core and tanks of each. Radiator non-overlapped portion 102' and charge air cooler non-overlapped portion 104' respectively extend horizontally out from the overlapped portion 118 on opposite sides thereof in the embodiment of FIGS. 6–8. This embodiment is preferred where it is desired to keep the overall height of the heat exchanger package as short as possible, so that core cooling area is made up in the length of the heat exchanger components. For applications where height is not an issue, for example where a high and narrow profile is desired, the embodiment of FIGS. 6–8 may be rotated 90° from the view shown in FIG. 7, so that the longer package dimension becomes the height, and the shorter package dimension becomes the width.

Figure 9:
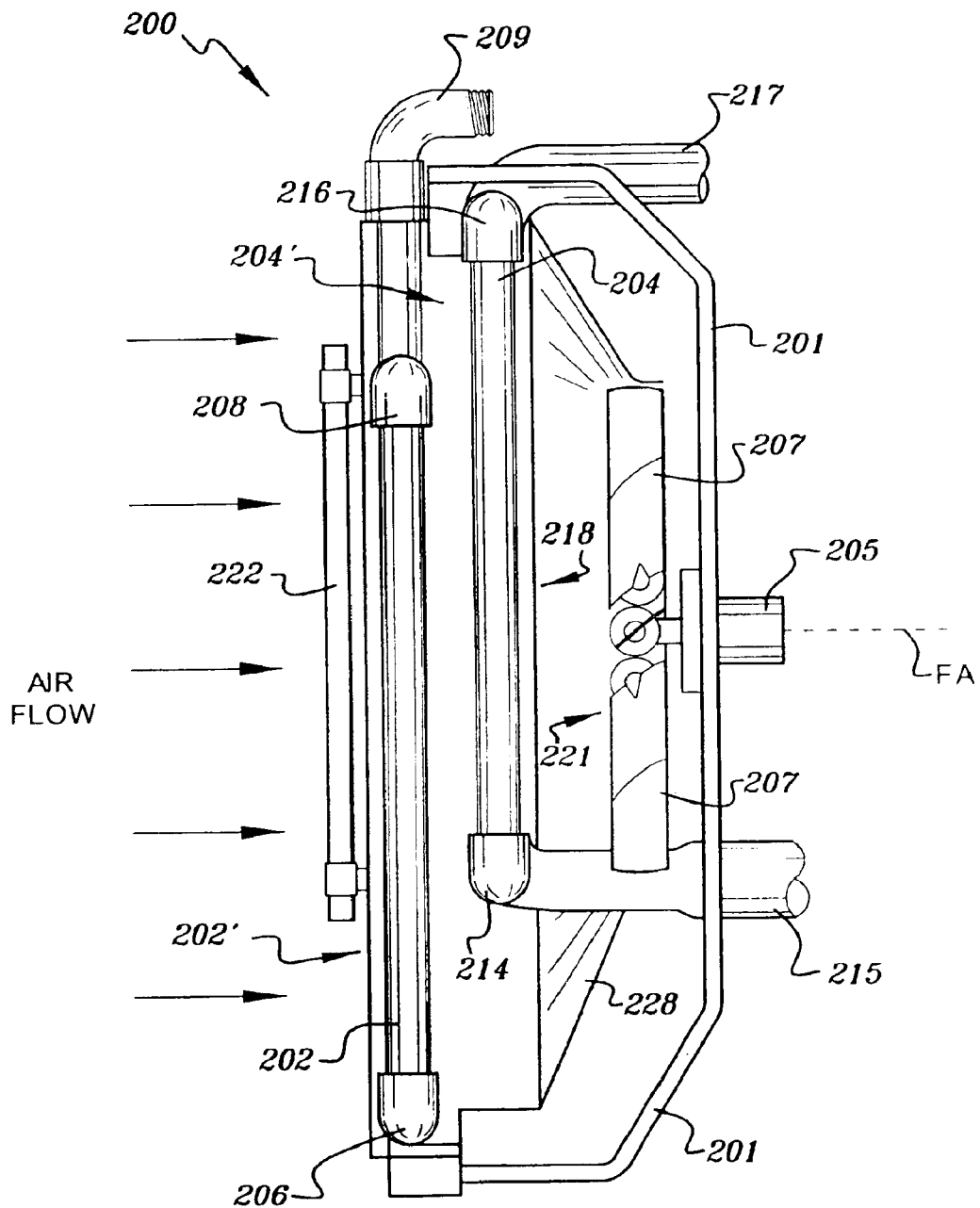
FIG. 9 is a top plan view of the vehicle radiator/charge air cooler heat exchanger package of FIG. 6, additionally showing the position of the suction fan and an optional air conditioning condenser.
Figure 10:
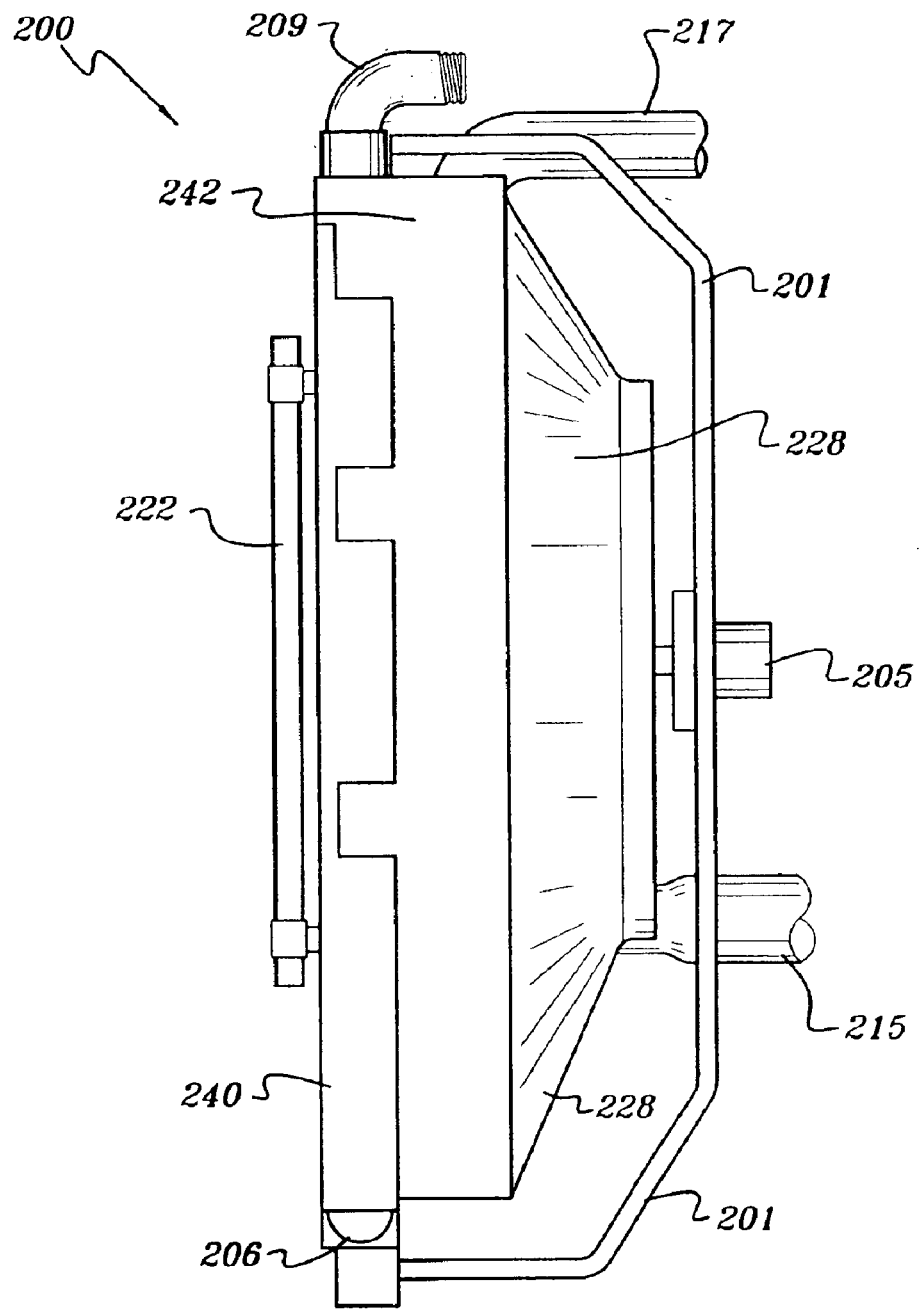
FIG. 10 is another top plan view of the preferred vehicle radiator/charge air cooler heat exchanger package, similar to FIG. 9, but showing the installation of covers and the fan shroud around the heat exchanger package of FIG. 6.
Figure 11:
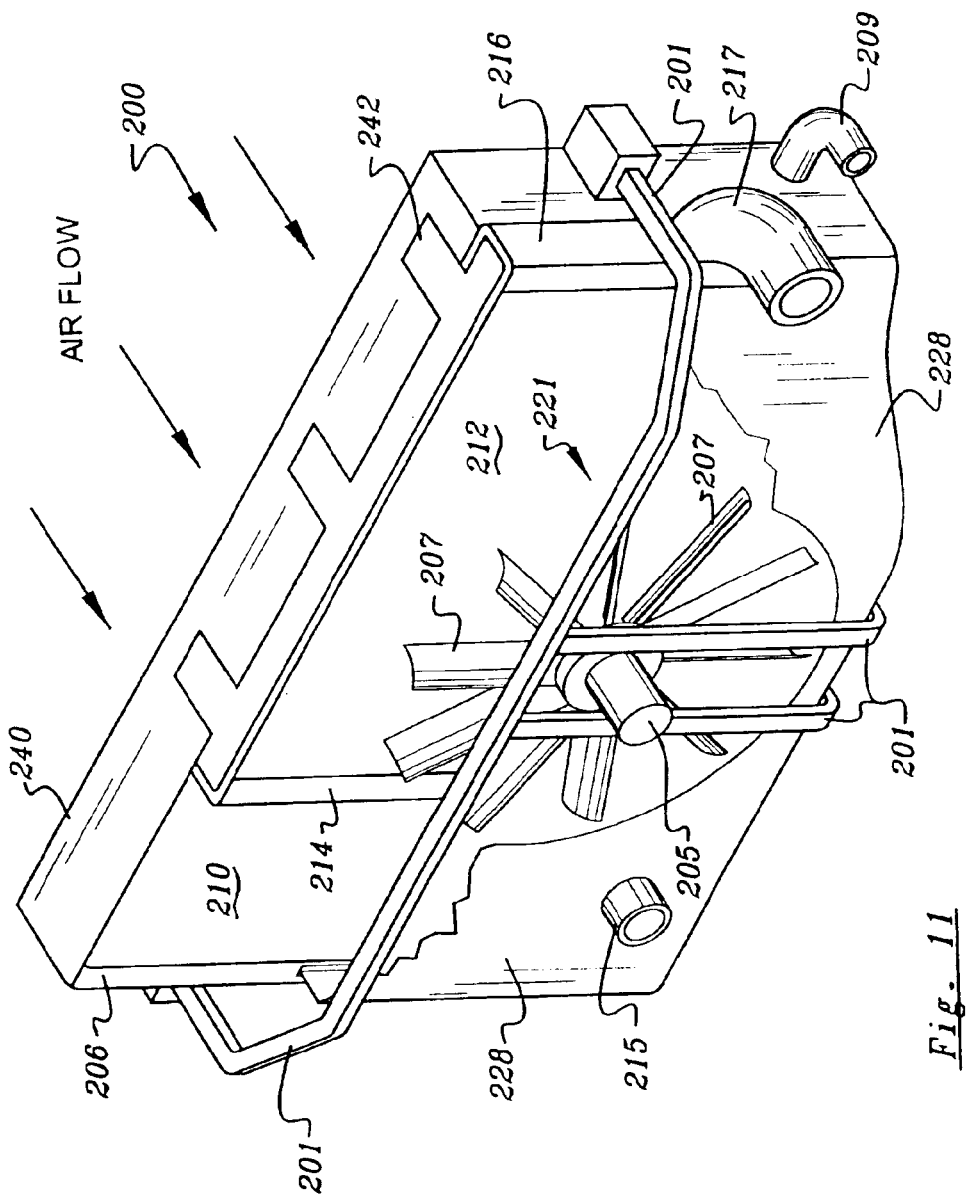
FIG. 11 is a perspective view, from the rear, of the embodiment of the preferred vehicle radiator/charge air cooler heat exchanger package of FIG. 6 showing the fan and fan shroud, with a portion of the latter cut-away.

FIGS. 9–11 depict the first embodiment of the heat exchanger package with a suction fan for providing cooling air to the radiator and charge air cooler. (The features of the heat exchanger package are generally the same as previously described, except that the identification number begins with a "2.") As shown in FIG. 9, the core faces of radiator 202 and charge air cooler 204 are spaced apart at the overlapped portions of each, and an optional air conditioning condenser 222 is shown spaced from and overlapped with radiator 202 on the opposite face over approximately the same area that the radiator is overlapped with charge air cooler 204. (Although not shown, other heat exchangers normally employed in motor vehicle engines may be added to or used in the heat exchanger package of the present invention, such as oil and transmission coolers.) Also shown are charge air cooler tank inlet 215 and tank outlet 217, permitting air flow into and out of the respective tanks 214, 216, as well as radiator tank outlet 209 permitting outflow of engine coolant from radiator tank 208. A tubular frame 201 connected to the radiator and charge air cooler holds fan motor 205 having rotating blades 207 aligned generally with the overlapped portion 218 of the heat exchanger package. Since fan 221 is a suction fan, the air flow is generally as shown by the direction of the arrows, with fresh ambient air sucked in series through condenser 222, and the overlapped portions of radiator 202 and charge air cooler 204. The air flows singularly and in parallel through each of the radiator and charge air cooler non-overlapping portions 202', 204', respectively. Essentially all of the air then flows through the fan itself. A fan shroud 228 extending circumferentially around the fan and other covers 240 and 242 (FIGS. 10 and 11) prevent air from leaking in behind and around the heat exchangers, to maximize cooling air flow through the heat exchanger cores.

Figure 12:
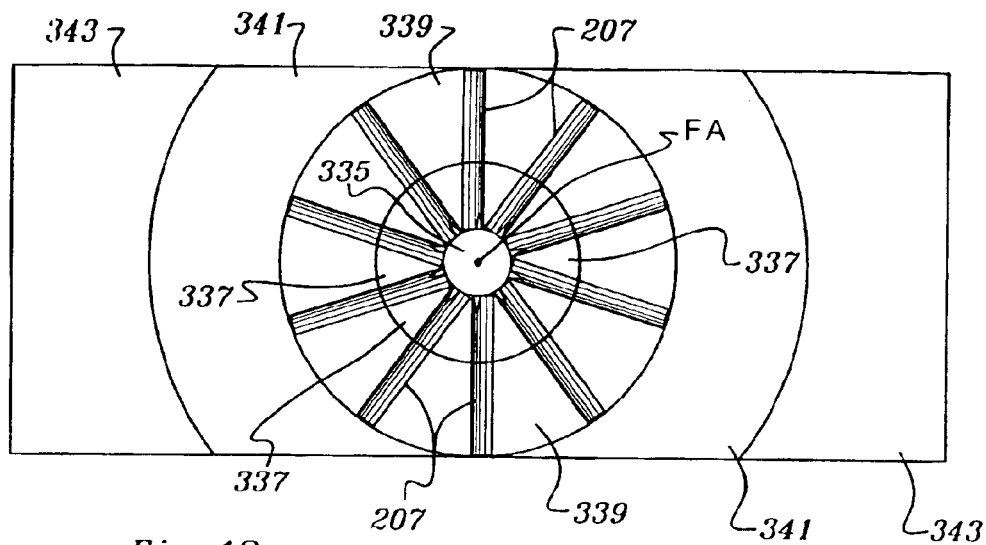
FIG. 12 is a diagram showing airflow velocity on the face of the heat exchanger package shown in FIGS. 6–11.

When a suction fan is positioned to provide air flow to a typical heat exchanger package, the resulting airflow is not distributed uniformly over the face of the heat exchangers. In the area of the heat exchangers corresponding to the center of the fan, airflow is very low and nearly zero because it is blocked by the fan hub and motor. In the area of the heat exchangers which is directly in line with and is swept by the fan blades, the airflow is a maximum and decreases toward the outer extremities of the rectangular heat exchanger cores within the shroud. FIG. 12 depicts the areas of minimum and maximum airflow corresponding to the face or front facing area of a typical heat exchanger package. The center of the heat exchanger is coincident with the fan axis FA and extending out radiantly from this axis is a first area of minimal (which may include zero) airflow 335, generally coinciding with the fan hub and motor. The next concentric area 337 extending out from the fan axis FA has a medium airflow, and forms a concentric circle about the area of minimal airflow 335. Maximum airflow is found in the next concentric area 339, corresponding to the swept area of the fan blades 207, followed by another concentric area of medium air flow 341, and a concentric low air flow area 343, as the distance from the fan blades increases.

Figure 13:
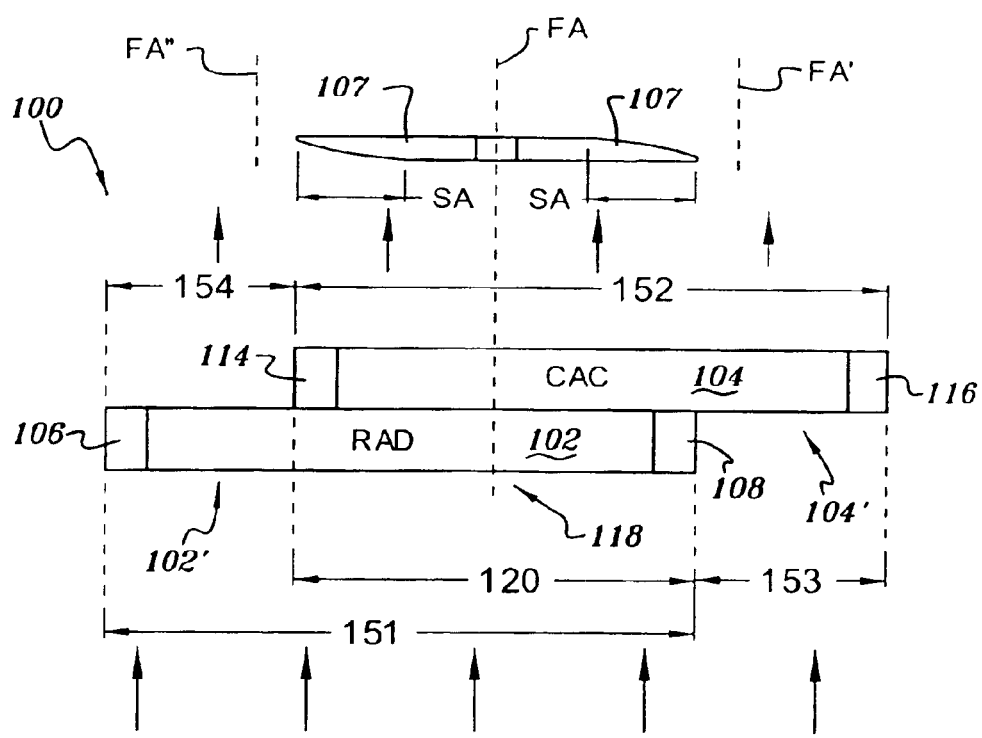
FIG. 13 is a plan view of the heat exchanger package of FIGS. 6–11 showing location of radiator and charge air cooler tanks relative to the fan, and possible variations in non-overlapping heat exchanger areas and location of the fan.

In accordance with the present invention, by selecting the location of the heat exchanger tanks with respect to the area swept by the fan blades, the tanks may be made to force distribution of air flow to other areas of the heat exchanger package away from the tanks. This is shown in FIG. 13 (without the fan shroud), wherein airflow direction is shown by the arrows, and fan blades 107 have swept areas SA of maximum air flow essentially aligned with overlapped end tank 114 of the charge air cooler, and overlapped end tank 108 of the radiator. The position of the tanks 108, 114 affects the air flow distribution over the heat exchanger package 100, by blocking the air provided by the fan, and as a result, diverting the air flow along the remaining surface area, particularly to the non-overlapping portions 102', 104'. Additionally, the amount of core overlap also may be used to control air flow, since the presence of two different cores in series at overlapped area 118 itself creates a restriction to air flow, and the air will naturally divert to some degree around this area. A number of other modifications may be made to the configuration shown in FIG. 13 during manufacturing to vary the cooling characteristics and overall effectiveness of the heat exchanger package. For example, the axis of the fan FA may be shifted from its centered position shown either toward the charge air cooler non-overlapped portion 104' at position FA' to favor cooling of the charge air cooler, or toward the radiator non-overlapped portion 102' at position FA" to favor cooling of the radiator. The fan may have various acceptable positions in relation to the heat exchanger package, as determined by testing, such that the fan is positioned to achieve a desired air flow pattern. More than one fan may be used, as well.

Figure 14:
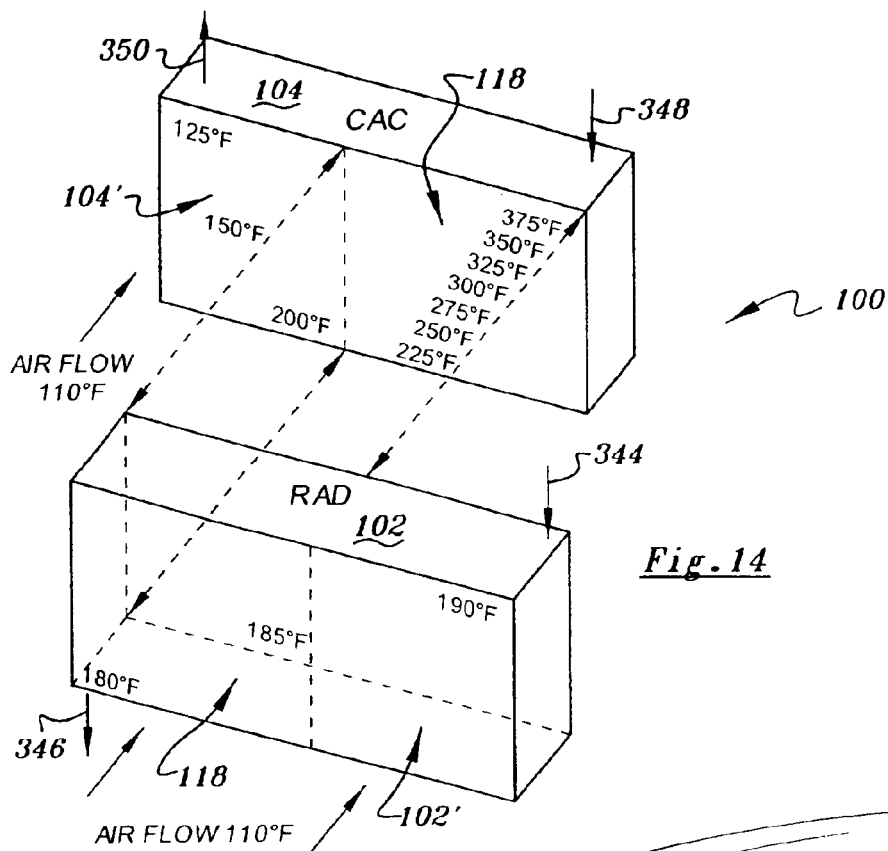
FIG. 14 is an exploded perspective view of the heat exchanger package shown in FIGS. 6–11 showing cooling fluid temperatures on the heat exchangers.

FIG. 14 depicts typical temperatures at various points across the cores of the radiator and charge air cooler in the present invention. Utilizing a tank arrangement similar to that shown in FIGS. 6–11, heated compressed air 348 enters the charge air cooler 104 into the tank at the overlapped end, and exits as cooled compressed air 350 from the tank at the non-overlapped end. Warm engine coolant 344 enters the radiator at the tank at the non-overlapped, end and exits as cooled engine coolant 346 at the tank at the overlapped end. In the embodiment shown in FIG. 14, the radiator and charge air coolers have cores of equal size, so that the areas of the two overlapped cores which are in series with each other are equal in area, and the areas of the two non-overlapped cores which are in parallel with each other are also equal in area. With the radiator in front of the charge air cooler, i.e., coming first in the cooling airflow stream, the entire radiator face area is exposed to fresh ambient cooling air. If the ambient cooling air is at 110° F. and the radiator coolant inlet 344 temperature is 190° F., with a drop of 10° F. through the radiator core, then the temperature of the cooling fluid 346 at the radiator outlet diagonally opposite the inlet corner is about 180° F., and the average radiator temperature is about 185° F. and the approach differential between the average radiator coolant temperature and the ambient cooling air is about 75° F. In the series overlapped area 118 of the heat exchanger package, if the charge air inlet 348 temperature is 375° F. and the cooling air leaving the radiator is about 180° F., the charge air cooler approach differential is about 195° F. on the right side of the series, overlapped core area. As the compressed, charge air moves through the charge air cooler to the left toward the parallel, non-overlapped portion, it becomes cooler, and the approach differential becomes smaller. When the charge air temperature reaches about 225° F., the approach differential becomes too small to be effective. At this point the compressed, charge air passes into the parallel, non-overlapped portion 104' which is exposed to fresh ambient air (which has not been heated by passage another heat exchanger), and the approach differential immediately increases to 115° F., and cooling of the charge air is more effective. By breaking up the heat exchanger areas into elements and applying conventional elemental heat transfer analysis, the amount of overlap, or series area, and the amounts of the parallel or non-overlapping areas, as well as the fan location, can be tailored to provide optimum heat transfer for a given heat exchanger package configuration.

Referring back to FIG. 13, the individual heat exchanger length dimensions (i.e., taken across the width of the motor vehicle) are shown wherein 151 is the overall length of the radiator, 152 is the overall length of the charge air cooler, 120 is the length of the radiator/charge air cooler overlapped portion, 153 is the length of the non-overlapped portion of the charge air cooler, and 154 is the length of the non-overlapped portion of the radiator. The heat exchangers of the present invention can be arranged during manufacturing so that the areas 102', 104' of the parallel lengths 154, 153 of the radiator and the charge air cooler, respectively, exposed to fresh cooling air are equal. Modifications may also be made to these dimensions to vary cooling characteristics. For example, a greater parallel (non-overlapping, exposed to fresh air) area or greater overlapping (in series) area may be allocated to one or both of the heat exchangers. The parallel and series areas may be adjusted by manipulating the overlapping area to a specified amount to achieve the desired effect. The length of the overlapping portion 120 can also be varied by shifting the radiator and the charge air cooler 102, 104, in combination or singly, for example, to accommodate space requirements inside an engine compartment or to accommodate a specific engine type. Varying the overlapping area can result in different cooling capability of the heat exchanger apparatus by varying the area of maximum cooling associated with the area of greatest air flow provided by a fan and/or provided by ambient air flow through the heat exchanger apparatus from the moving vehicle.

Determining the size 120 of the overlapping area 118 (FIGS. 6, 7, 13) is typically determined using a computerized program that estimates the heat transfer performance based on projecting the amount of air flow that will pass through each portion of the heat exchanger. After establishing the preferred fan position and overlap to provide the desired heat transfer, mounting fixtures 201 (FIGS. 9–11) are designed and attached during manufacturing to fix the heat exchangers to each other and to the fan in the preferred position.

Figure 15:
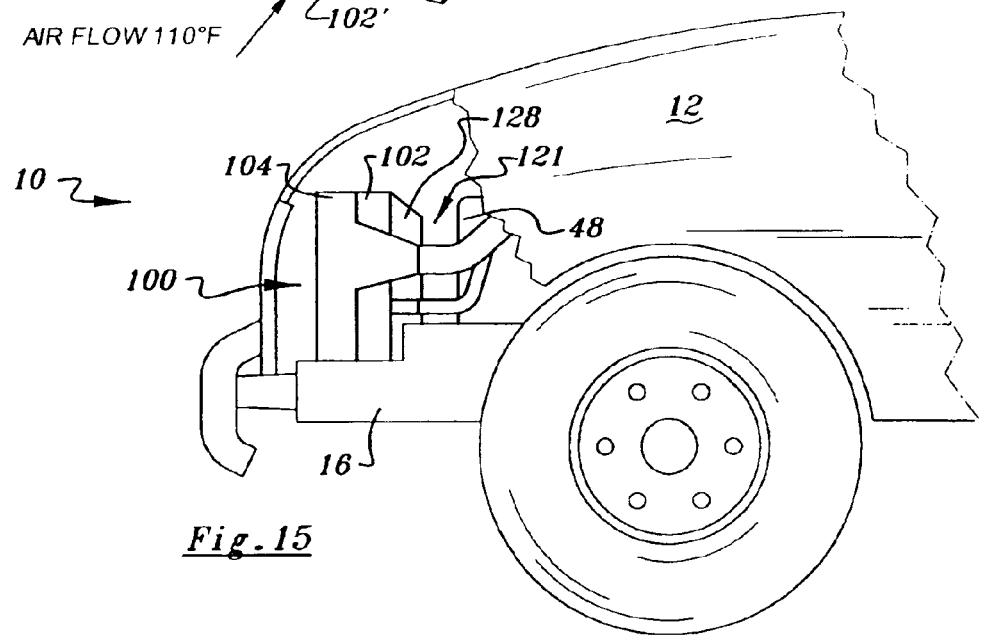
FIG. 15 is a side elevational view, partially cut-away, showing the heat exchanger package of the present invention mounted in the forward portion of the engine compartment of an over-the-road truck.

Referring to FIG. 15, a heavy duty truck 10 is shown including engine 48 located in engine compartment 12 at the front portion of the truck. The vehicle includes a lower frame 16 having the heat exchanger package 100 mounted thereto at the front end of engine compartment 12. Fan 121 is mounted within fan shroud 128 positioned behind the heat exchanger apparatus 100. The heat exchanger package 100 includes radiator 102 and charge air cooler 104, which are operatively connected to engine 48 and provide the cooling for the engine coolant and engine charge air, respectively.

Figure 16:
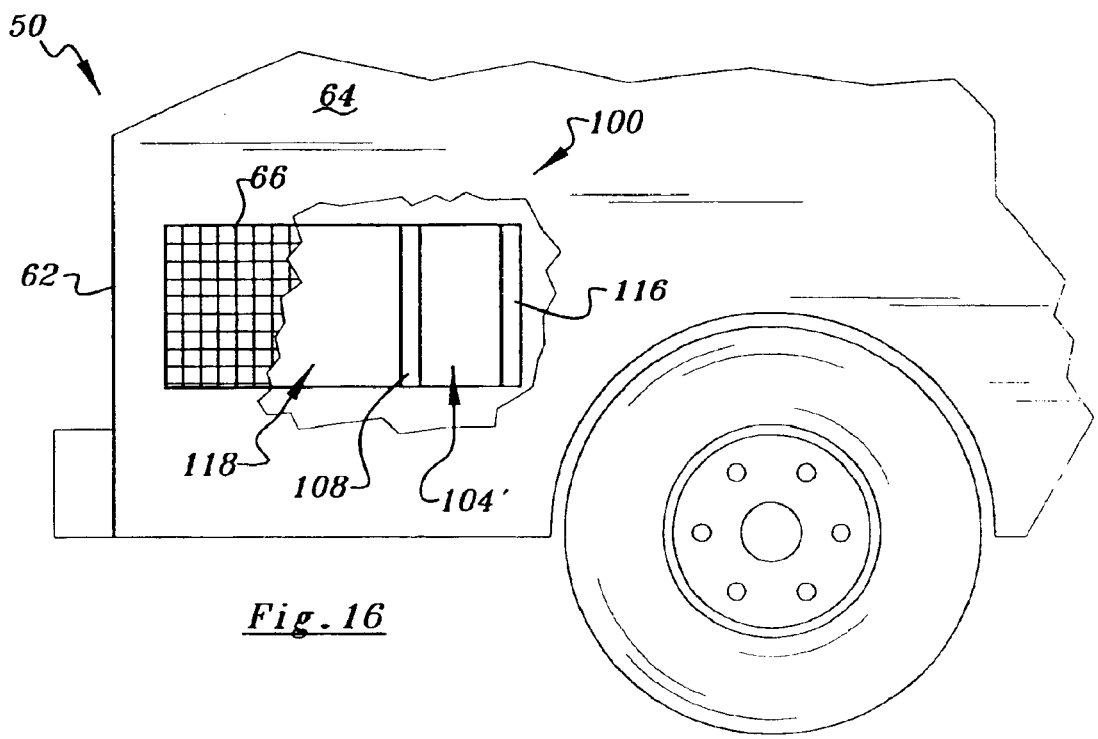
FIG. 16 is a side elevational view, partially cut-away, showing the heat exchanger package of the present invention mounted in the rear side portion of the engine compartment of a recreational vehicle.
Figure 17:
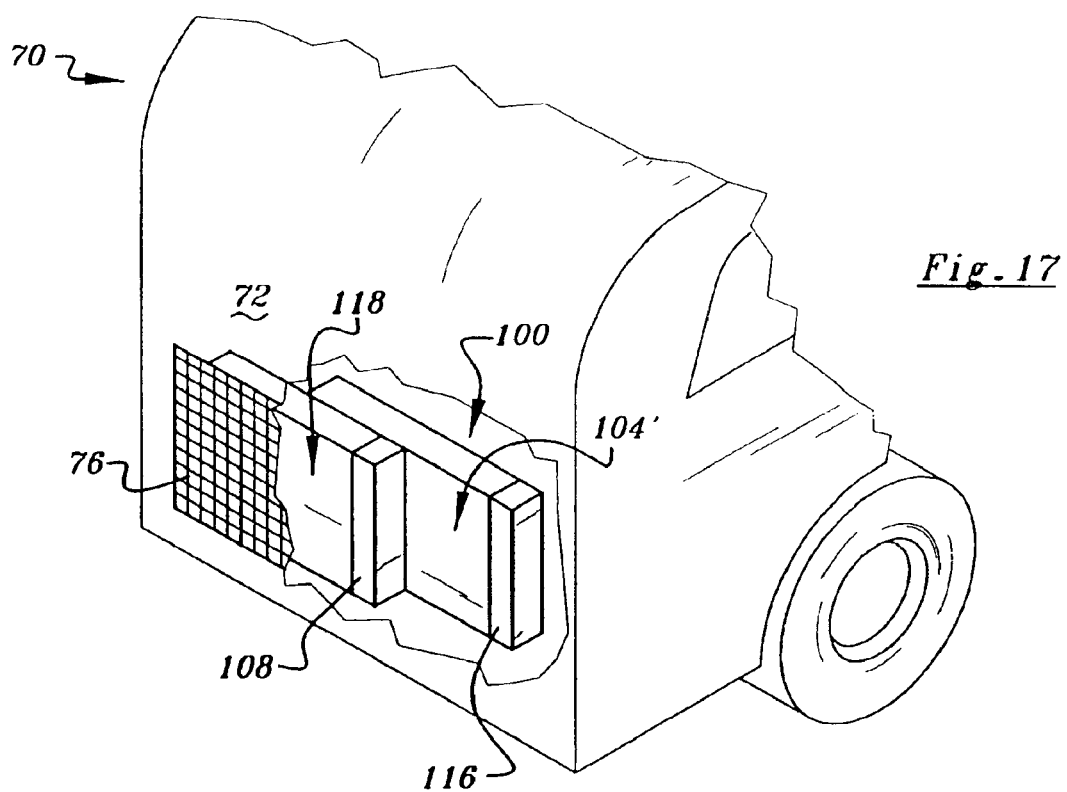
FIG. 17 is a perspective view, from the rear and partially cut-away, showing the heat exchanger package of the present invention mounted in the rear portion of the engine compartment of a highway bus.

FIG. 16 shows heat exchanger package 100 mounted in a rear-engine recreational vehicle 50, where 62 identifies the rear end and 64 identifies the side portion near the rear. A grill 66 covers heat exchanger package 100 whose face is along the side of the vehicle for cooling the radiator and charge air cooler. FIG. 17 shows yet another embodiment of the present invention where the heat exchanger package 100 is mounted in the engine compartment of a highway bus 70, behind grill 76 on the bus rear end 72.

The radiators and charge air coolers of heat exchanger packages of FIGS. 6–17 are preferably crossflow heat exchangers. Crossflow heat exchangers move the fluid to be cooled transversally across the core of the heat exchanger, in the direction of the length dimensions depicted. In contrast, downflow heat exchangers move fluid to be cooled downwardly in the core of the heat exchanger. However, two downflow heat exchangers, or a combination of a downflow and a crossflow heat exchanger may be used, within the scope of this invention, since a downflow heat exchanger may be necessary to provide a desired piping configuration or to fit the allotted space.

Figure 18:
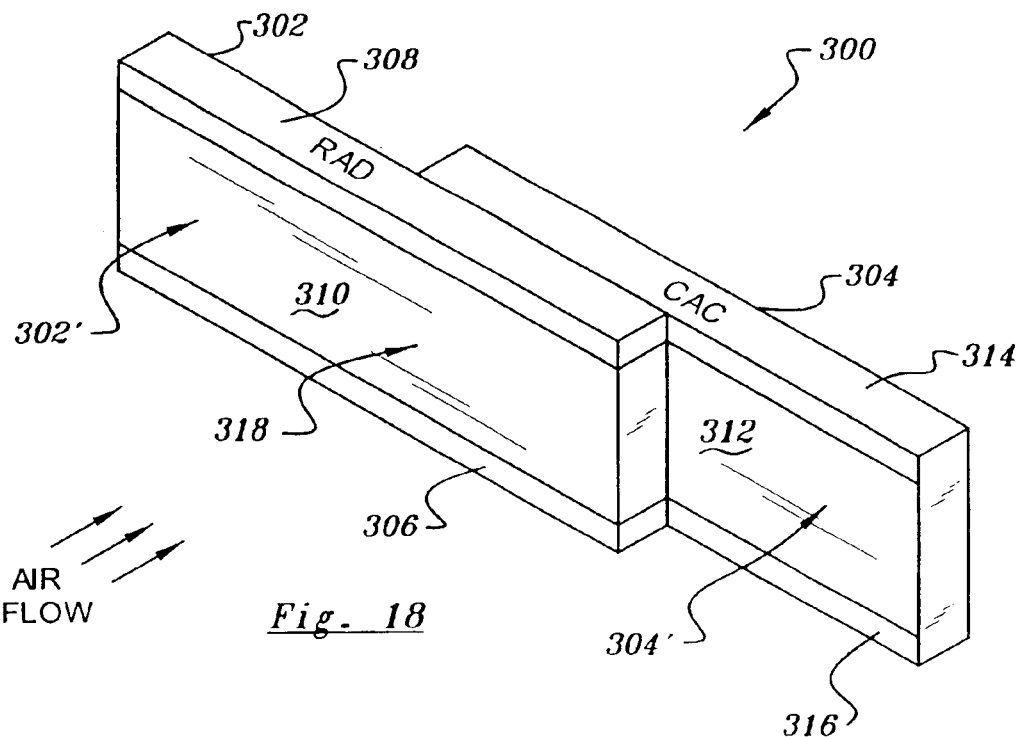
FIG. 18 is a perspective view, from the front, of a modification of the preferred embodiment of the present invention showing the heat exchanger package with tanks extending along the upper and lower ends of the radiator and charge air cooler.

In another embodiment shown in FIG. 18, a heat exchanger package 300 according to the present invention includes a downflow radiator 302 and charge air cooler 304 having an overlapping portion 318 as in previous embodiments. (Again, the features are generally the same as previously described, except that the identification number begins with a "3.") However, in the heat exchanger package 300, the respective tanks for each heat exchanger are positioned opposite one another, along the lengths of the top and bottom of the radiator 302 and charge air cooler 304, above and below the cores of each. Radiator 302 includes a top tank 308 and a bottom tank 306, and charge air cooler 304 includes a top tank 314 and a bottom tank 316. Other than the tank position, the other components of the systems such as the fan may be configured as previously described.

Figure 19:
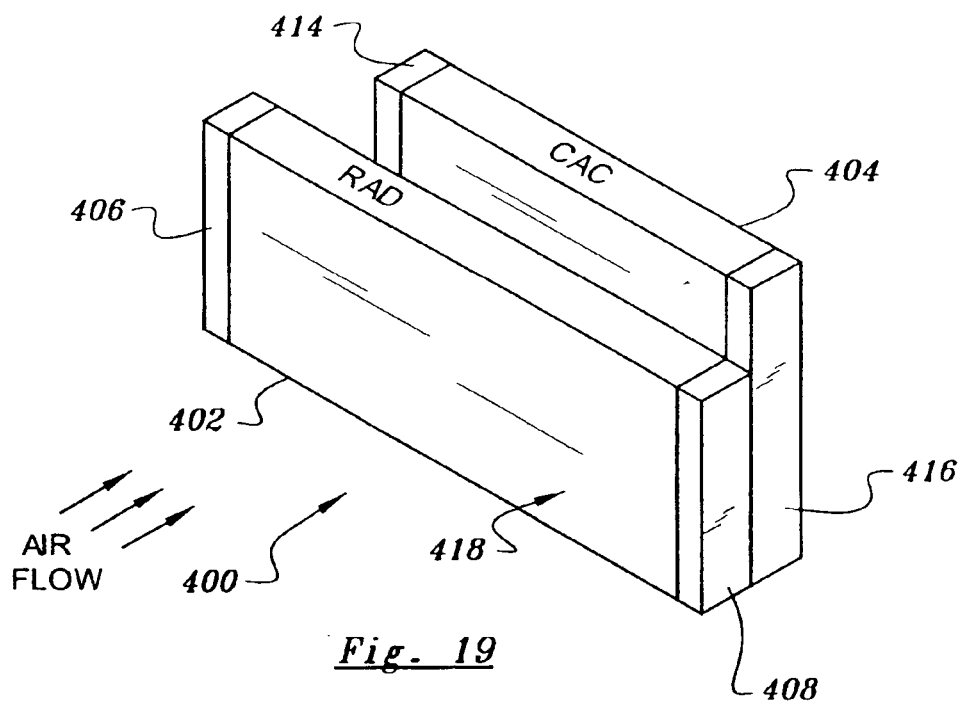
FIG. 19 is a perspective view, from the front, of another embodiment of the present invention showing the radiator/charge air cooler heat exchanger package with the non-overlapped end portions respectively on the side of and above the overlapped end portions.
Figure 20:
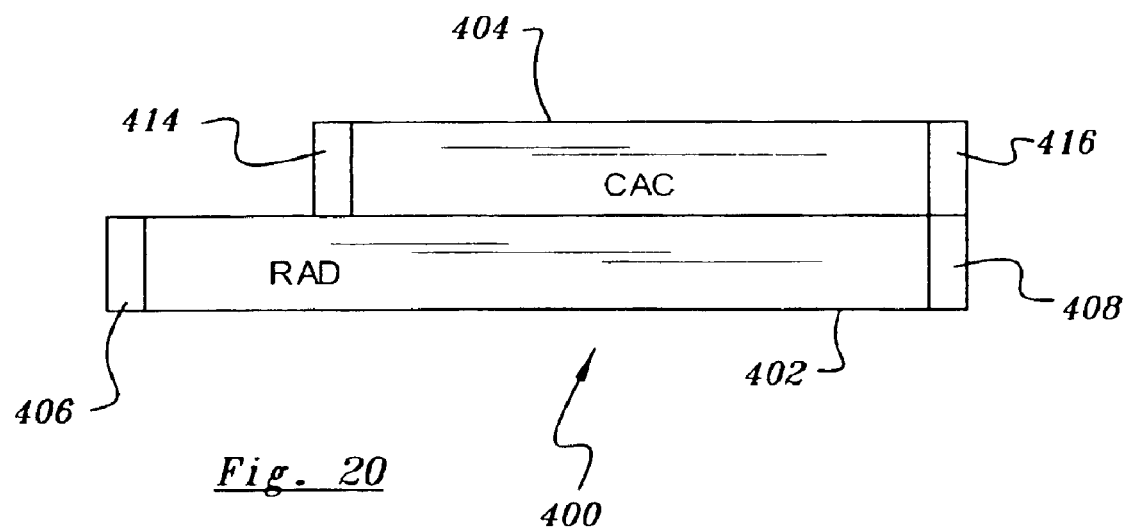
FIG. 20 is a top plan view of the vehicle radiator/charge air cooler heat exchanger package of FIG. 19.
Figure 21:
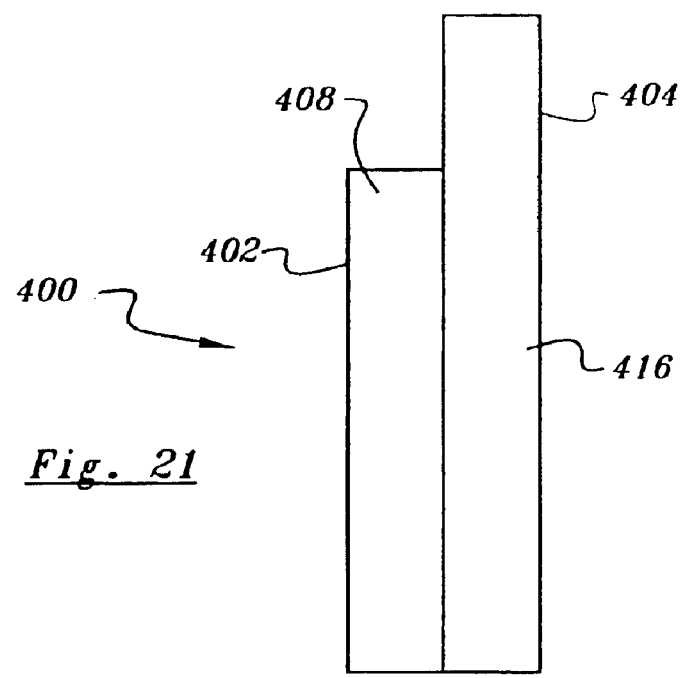
FIG. 21 is a side elevational view of the preferred vehicle radiator/charge air cooler heat exchanger package of FIG. 19.

FIGS. 19–21 depict a further embodiment of the heat exchanger package of the present invention, where the features are also the same as previously described, except that the identification number begins with a "4." Heat exchanger package 400 again includes radiator 402 and charge air cooler 404 with overlapped portions 418 at an end of each. The non-overlapped portions 402' and 404' of each of the radiator and charge air cooler, respectively, are again at opposite ends from their overlapped portions, but in this embodiment the non-overlapped portions do not extend out on opposite sides of the overlapped portions, but instead extend out on adjacent sides of the overlapped portions. In other words, the general configuration of the direction of the non-overlapped portions here is 90° (as seen looking at the faces of the heat exchangers), as compared to 180° separation of the non-overlapped portions of the previous embodiments. Other than the direction of the non-overlapped portions, the other components of the systems such as the fan may be configured as previously described. This embodiment may be used where a shorter overall length of the package, across the width if the vehicle, is of greater importance, and it is not as important to keep a shorter height.

Thus, the heat exchanger package according to the present invention achieves the objects described above. The radiator and charge air cooler of the heat exchanger package are geometrically advantageous in truck and bus applications, and may provide a wide and low heat exchanger package for aerodynamic sloping hoods in trucks, and for compact installations in the rear of buses. The heat exchanger package may be readily modified to provide optimal air flow distributed to specific areas of the radiator/charge air cooler heat exchangers.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A heat exchanger apparatus using air to cool fluids for a motor vehicle comprising:
   a first heat exchanger for cooling a first fluid having a length between opposite ends and including front and rear opposite faces through which air flows;
   a second heat exchanger for cooling a second fluid having a length between opposite ends and including front and rear opposite faces through which air flows;
   each of the first and second heat exchangers including an overlapping fluid-cooling portion at one end of the heat exchanger wherein the rear face at one end of the first heat exchanger is disposed adjacent the front face at one end of the second heat exchanger, such that the air flows sequentially in series through the overlapping portions of each of the first and second heat exchangers; and
   each of the first and second heat exchangers each having a non-overlapping fluid-cooling portion at the end opposite the overlapping portion end wherein the rear face at the opposite end of the first heat exchanger extends outward of the second heat exchanger and the front face at the opposite end of the second heat exchanger extends outward of the first heat exchanger, such that the air flows singularly and in parallel through each of the non-overlapping portions of the first and second heat exchangers.

2. The heat exchanger apparatus of claim 1 wherein the lengths of each of the heat exchangers are parallel to each other and the non-overlapping portions are on opposite sides of the overlapping portions.

3. The heat exchanger apparatus of claim 1 wherein the lengths of each of the first and second heat exchangers are perpendicular to each other and the non-overlapping portions are on adjacent sides of the overlapping portions.

4. The heat exchanger apparatus of claim 1 wherein the first and second heat exchangers each have a height, and the length is greater than the height.

5. The heat exchanger apparatus of claim 1 wherein the first and second heat exchangers have substantially the same length and height.

6. The heat exchanger apparatus of claim 1 wherein the first and second heat exchangers each have a length which is at least about fifty percent greater than the height.

7. The heat exchanger apparatus of claim 1 further including tanks attached at opposite ends of the lengths of each of the first and second heat exchangers for holding the respective fluids of the first and second heat exchangers.

8. The heat exchanger apparatus of claim 1 wherein the first and second heat exchangers each have a height and further including tanks attached at opposite ends of the height of each of the first and second heat exchangers for holding the respective fluids of the first and second heat exchangers.

9. The heat exchanger apparatus of claim 1 in combination with a motor vehicle having an engine positioned within an engine compartment at one end of the vehicle, the heat exchanger apparatus disposed in the engine compartment of the vehicle adjacent the engine, the lengths of each of the heat exchangers being parallel to each other and substantially horizontal and the non-overlapping portions of the heat exchangers being on opposite sides of the overlapping portions, and further including a fan disposed adjacent the overlapping portions of the first and second heat exchangers to provide air flow in series therethrough.

10. The heat exchanger apparatus in combination with a motor vehicle of claim 9 wherein the engine compartment of the motor vehicle is in the front portion of the vehicle and the heat exchanger apparatus is disposed along a front of the vehicle, and further including a hood covering the engine compartment, the hood sloping downwardly towards the front of the vehicle.

11. The heat exchanger apparatus in combination with a motor vehicle of claim 9 wherein the engine compartment of the motor vehicle is in the rear portion of the vehicle and the heat exchanger apparatus is disposed along a rear of the vehicle.

12. The heat exchanger apparatus in combination with a motor vehicle of claim 9 wherein the engine compartment of the motor vehicle is in the rear portion of the vehicle and the heat exchanger apparatus is disposed along a rear portion side of the vehicle.

13. The heat exchanger apparatus in combination with a motor vehicle of claim 9 wherein one of the heat exchangers is a radiator for cooling liquid engine coolant, and the other of the heat exchangers is a charge air cooler for cooling compressed air to the engine.

14. The heat exchanger apparatus in combination with a motor vehicle of claim 9 further including tanks attached at opposite ends of the length of each of the first and second heat exchangers for holding the respective fluids of the first and second heat exchangers, wherein a first tank attached to one end of the first heat exchanger is disposed adjacent the front face of the second heat exchanger in the region between the second heat exchanger overlapping and non-overlapping portions and a first tank attached to one end of the second heat exchanger is disposed adjacent the rear face of the first heat exchanger in the region between the first heat exchanger overlapping and non-overlapping portions.

15. The heat exchanger apparatus in combination with a motor vehicle of claim 14 wherein the fan is rotatable about an axis and has at least two blades normally adapted to create a higher air flow across an area aligned with the blades and a lower air flow across an area not aligned with the blades, the blades being substantially aligned with the first tanks of each of the heat exchangers when viewed in a direction normal to both the fan axis and heat exchanger length, whereby the first tanks of each of the heat exchangers block at least a portion of the fan higher air flow and divert at least a portion of such air through the area not aligned with the fan blades.

16. The heat exchanger apparatus in combination with a motor vehicle of claim 15 wherein the overlapping portion of the first and second heat exchangers restricts air flow to divert at least a portion of air through the non-overlapping portions of the first and second heat exchangers.

17. The heat exchanger apparatus in combination with a motor vehicle of claim 15 further including a shroud for containing the air flow initiated by the fan proximate to the heat exchanger apparatus.

18. A heat exchanger apparatus using air to cool fluids for a motor vehicle comprising:
   a first heat exchanger for cooling a first fluid having a length between opposite ends and including front and rear opposite faces through which air flows;
   a second heat exchanger for cooling a second fluid having a length between opposite ends and including front and rear opposite faces through which air flows;
   each of the first and second heat exchangers including an overlapping fluid-cooling portion at one end of the heat exchanger wherein the rear face at one portion of the first heat exchanger is disposed adjacent the front face at one portion of the second heat exchanger, such that the air flows sequentially in series through the overlapping portions of each of the first and second heat exchangers,
   each of the first and second heat exchangers having a non-overlapping fluid-cooling portion at the end opposite the overlapping portion end wherein the rear face at another portion of the first heat exchanger extends outward of the second heat exchanger and the front face at another portion of the second heat exchanger extends outward of the first heat exchanger, such that the air flows singularly and in parallel through each of the non-overlapping portions of the first and second heat exchangers,
   tanks attached at opposite ends of the length of each of the first and second heat exchangers for holding the respective fluids of the first and second heat exchangers, wherein a first tank attached to one end of the first heat exchanger is disposed adjacent the front face of the second heat exchanger in the region between the second heat exchanger overlapping and non-overlapping portions and a first tank attached to one end of the second heat exchanger is disposed adjacent the rear face of the first heat exchanger in the region between the first heat exchanger overlapping and non-overlapping portions; and
   a fan disposed adjacent the overlapping portions of the first and second heat exchangers to provide air flow in series therethrough, the fan being rotatable about an axis and having at least two blades normally adapted to create a higher air flow across an area aligned with the blades and a lower air flow across an area not aligned with the blades, the blades being substantially aligned with the first tanks of each of the heat exchangers when viewed in a direction normal to both the fan axis and heat exchanger length, whereby the first tanks of each of the heat exchangers block at least a portion of the fan higher air flow and divert at least a portion of such air through the area not aligned with the fan blades.

19. The heat exchanger apparatus of claim 18 wherein the overlapping portion of the first and second heat exchangers restricts air flow to divert at least a portion of air through the non-overlapping portions of the first and second heat exchangers.

20. A highway truck having an engine positioned within an engine compartment at the front portion thereof, a hood covering the engine compartment and sloping downwardly towards the front portion, and a heat exchanger apparatus disposed in the engine compartment of the truck adjacent the engine for cooling engine fluids comprising:
   a first heat exchanger for cooling a first fluid having a length between opposite ends and including front and rear opposite faces through which air flows;
   a second heat exchanger for cooling a second fluid having a length between opposite ends and including front and rear opposite faces through which air flows;
   each of the first and second heat exchangers including an overlapping fluid-cooling portion at one end of the heat exchanger wherein the rear face at one end of the first heat exchanger is disposed adjacent the front face at one end of the second heat exchanger, such that the air flows sequentially in series through the overlapping portions of each of the first and second heat exchangers;
   each of the first and second heat exchangers each having a non-overlapping fluid-cooling portion at the end opposite the overlapping portion end wherein the rear face at the opposite end of the first heat exchanger extends outward of the second heat exchanger and the front face at the opposite end of the second heat exchanger extends outward of the first heat exchanger, the lengths of each of the heat exchangers being parallel to each other and the non-overlapping portions being on opposite sides of the overlapping portions, such that the air flows singularly and in parallel through each of the non-overlapping portions of the first and second heat exchangers;

tanks attached at opposite ends of the length of each of the first and second heat exchangers for holding the respective fluids of the first and second heat exchangers, wherein a first tank attached to one end of the first heat exchanger is disposed adjacent the front face of the second heat exchanger in the region between the second heat exchanger overlapping and non-overlapping portions and a first tank attached to one end the second heat exchanger is disposed adjacent the rear face of the first heat exchanger in the region between the first heat exchanger overlapping and non-overlapping portions; and a fan disposed adjacent the overlapping portions of the first and second heat exchangers to provide air flow in series therethrough, the fan rotating about an axis and having at least two blades normally adapted to create a higher air flow across an area aligned with the blades and a lower air flow across an area not aligned with the blades, the blades being substantially aligned with the first tanks of each of the heat exchangers when viewed in a direction normal to both the fan axis and heat exchanger length, whereby the first tanks of each of the heat exchangers block at least a portion of the fan higher air flow and divert at least a portion of such air through the area not aligned with the fan blades.

21. The highway truck of claim 20 wherein the overlapping portion of the first and second heat exchangers restricts air flow to divert at least a portion of air through the non-overlapping portions of the first and second heat exchangers.

22. The highway truck of claim 20 wherein one of the heat exchangers is a radiator for cooling liquid engine coolant, and the other of the heat exchangers is a charge air cooler for cooling compressed intake air to the engine.

23. A method of manufacturing a heat exchanger apparatus for cooling fluids used in an engine of a motor vehicle, comprising:

providing a first heat exchanger for cooling a first fluid having a length between opposite ends and including front and rear opposite faces;

providing a second heat exchanger for cooling a second fluid having a length between opposite ends and including front and rear opposite faces through which air flows; and positioning the first and second heat exchangers to provide:

i) an overlapping fluid-cooling portion at one end of each of the heat exchangers wherein the rear face at one end of the first heat exchanger is disposed adjacent the front face at one end of the second heat exchanger, such that the air flows sequentially in series through the overlapping portions of each of the first and second heat exchangers, and ii) a non-overlapping fluid-cooling portion at the end opposite the overlapping portion end wherein the rear face at the opposite end of the first heat exchanger extends outward of the second heat exchanger and the front face at the opposite end of the second heat exchanger extends outward of the first heat exchanger, such that the air flows singularly and in parallel through each of the non-overlapping portions of the first and second heat exchangers;

determining the cooling efficiencies of the first and second heat exchangers; and positioning the first and second heat exchangers to increase or decrease the overlapping and non-overlapping fluid-cooling portions to optimize the heat exchanger cooling efficiencies.

24. The method of claim 23 further including:

providing tanks attached at opposite ends of the length of each of the first and second heat exchangers for holding the respective fluids of the first and second heat exchangers, wherein a first tank attached to one end of the first heat exchanger is disposed adjacent the front face of the second heat exchanger in the region between the second heat exchanger overlapping and non-overlapping portions and a first tank attached to one end the second heat exchanger is disposed adjacent the rear face of the first heat exchanger in the region between the first heat exchanger overlapping and non-overlapping portions; and providing a fan disposed adjacent the overlapping portions of the first and second heat exchangers to provide air flow in series therethrough, the fan being rotatable about an axis and having at least two blades normally adapted to create a higher air flow across an area aligned with the blades and a lower air flow across an area not aligned with the blades, the blades being substantially aligned with the first tanks of each of the heat exchangers when viewed in a direction normal to both the fan axis and heat exchanger length, the first tanks of each of the heat exchangers blocking at least a portion of the fan higher air flow and diverting at least a portion of such air through the area not aligned with the fan blades, wherein positioning the first and second heat exchangers includes adjusting the alignment of the fan blades with the first tanks to optimize the heat exchanger cooling efficiencies.

25. The method of claim 23 further including providing a fan disposed adjacent the first and second heat exchangers to provide air flow therethrough, and positioning the fan with respect to the overlapping and non-overlapping portions of the heat exchangers to optimize the heat exchanger cooling efficiencies.

26. A method for cooling fluids used in an engine of a motor vehicle, comprising:

providing a heat exchanger assembly comprising:

a first heat exchanger for cooling a first fluid having a length between opposite ends and including front and rear opposite faces;

a second heat exchanger for cooling a second fluid having a length between opposite ends and including front and rear opposite faces;

each of the first and second heat exchangers including an overlapping fluid-cooling portion at one end of the heat exchanger wherein the rear face at one end of the first heat exchanger is disposed adjacent the front face at one end of the second heat exchanger, such that the air flows sequentially in series through the overlapping portions of each of the first and second heat exchangers; and each of the first and second heat exchangers each having a non-overlapping fluid-cooling portion at the end opposite the overlapping portion end wherein the rear face at the opposite end of the first heat exchanger extends outward of the second heat exchanger and the front face at the opposite end of the second heat exchanger extends outward of the first heat exchanger, such that the air flows singularly and in parallel through each of the non-overlapping portions of the first and second heat exchangers; and flowing ambient air through the heat exchanger assembly such that the ambient air flows sequentially in series through the overlapped portions of each of the first and second heat exchangers and the ambient air flows singularly in parallel through each of the non-overlapped portions of the first and second heat exchangers.

27. The method of claim 26 including flowing liquid engine coolant through one of the heat exchangers and flowing compressed charge air through the other of the heat exchangers.

* * * * *